(12) United States Patent
Vincent

(10) Patent No.: US 7,797,375 B2
(45) Date of Patent: Sep. 14, 2010

(54) SYSTEM AND METHOD FOR RESPONDING TO RESOURCE REQUESTS IN DISTRIBUTED COMPUTER NETWORKS

(75) Inventor: Christopher R. Vincent, Arlington, MA (US)

(73) Assignee: International Business Machines Corporat, Armonk, NY (US)

( * ) Notice: Subject to any disclaimer, the term of this patent is extended or adjusted under 35 U.S.C. 154(b) by 1752 days.

(21) Appl. No.: 09/850,390

(22) Filed: May 7, 2001

(65) Prior Publication Data

US 2002/0165979 A1 Nov. 7, 2002

(51) Int. Cl.
*G06F 15/16* (2006.01)

(52) U.S. Cl. ...................................... 709/203

(58) Field of Classification Search ................ 709/203, 709/217, 219, 225, 226, 229; 707/10
See application file for complete search history.

(56) References Cited

U.S. PATENT DOCUMENTS

| | | | |
|---|---|---|---|
| 4,412,285 A | 10/1983 | Neches et al. | |
| 4,543,630 A | 9/1985 | Neches | |
| 4,814,979 A | 3/1989 | Neches | |
| 4,945,471 A | 7/1990 | Neches | |
| 5,768,528 A * | 6/1998 | Stumm | 709/231 |
| 5,819,032 A * | 10/1998 | de Vries et al. | 709/250 |
| 5,826,269 A | 10/1998 | Hussey | |
| 5,970,231 A | 10/1999 | Crandall | |
| 6,021,443 A * | 2/2000 | Bracho et al. | 709/241 |
| 6,324,587 B1 * | 11/2001 | Trenbeath et al. | 719/310 |
| 6,334,151 B1 | 12/2001 | Bolam et al. | |
| 6,336,119 B1 | 1/2002 | Banavar et al. | |
| 6,356,929 B1 * | 3/2002 | Gall et al. | 709/201 |
| 6,401,121 B1 * | 6/2002 | Yoshida et al. | 709/227 |

(Continued)

FOREIGN PATENT DOCUMENTS

| | | |
|---|---|---|
| EP | 0213277 | 3/1987 |
| EP | 0806731 | 11/1997 |
| WO | WO 00/24386 | 5/2000 |

OTHER PUBLICATIONS

Reiter, Michael K. et al., "Crowds: Anonymity for Web Transactions", ACM Transactions on Information and System Security, vol. 1, No. 1, Nov. 1998, pp. 66-92.

(Continued)

*Primary Examiner*—Lashonda T Jacobs
(74) *Attorney, Agent, or Firm*—Stephen Bongini; Fleit Gibbons Gutman Bongini & Bianco PL

(57) ABSTRACT

A method is provided for responding to a resource request from a requesting user node in a network of user nodes. According to the method, a response to the resource request is received at a first user node of the network, and it is determined (e.g., randomly) whether or not to send the response back to the requesting user node. When it is determined not to send the response to the requesting user node, the response is forwarded to a second user node of the network through a direct connection. When it is determined to send the response to the requesting user node, the response is sent back to the requesting user node. Also provided is a user node for use in a computer network having user nodes that are each connected to other user nodes through direct connections.

31 Claims, 11 Drawing Sheets

U.S. PATENT DOCUMENTS

| | | | |
|---|---|---|---|
| 6,405,191 B1 * | 6/2002 | Bhatt et al. | ............ 707/3 |
| 6,446,116 B1 | 9/2002 | Burridge | |
| 6,553,411 B1 * | 4/2003 | Dias et al. | ............ 709/219 |
| 6,636,886 B1 | 10/2003 | Katiyar et al. | |
| 6,643,682 B1 | 11/2003 | Todd et al. | |
| 6,732,237 B1 * | 5/2004 | Jacobs et al. | ............ 711/119 |
| 6,742,023 B1 | 5/2004 | Fanning et al. | |
| 6,779,004 B1 | 8/2004 | Zintel | |
| 6,829,770 B1 * | 12/2004 | Hinson et al. | ............ 719/318 |
| 7,114,003 B2 | 9/2006 | Chapman et al. | |

OTHER PUBLICATIONS

"Management of Retained Messages in Publish/Subscribe System," Research Disclosure, Mar. 1999, disclosed by International Business Machines Corporation.

Banavar, G.; Chandra, T. et al.; "An efficient multicast protocol for content-based publish-subscribe systems", Distributed Computing Systems, 1999. Proceedings. 19$^{th}$ IEEE International Conference, May 31-Jun. 4, 1999, pp. 262-272.

Lechner et al., "Communities-Business Models and System Architectures: The Blueprint of MP3.com, Napster and Gnutella Revisited." Proceedings of the 34$^{th}$ Annual Hawaii International Conference on System Sciences, Jan. 2001, 10 pgs., 0-7695-0981-9/01 © 2001 IEEE. Switzerland.

Heimbigner et al., "Adapting Publish/Subscribe Middleware to Achieve Gnutella-like Functionality", Proceedings of the 2001 ACM Symposium on Applied Computing, Mar. 2001, pp. 176-181, Las Vegas, Nevada.

RFC 887, Resource Location Protocol, XP-002159790, M. Accetta, Dec. 1983.

RFC2608, Service Location Protocol, Version 2, XP-002193190, E. Guttman et al., Jun. 1999.

"A Process for Authorized Service Discovery In Distributed Computing Environments", Research Disclosure, XP-002212114, No. 429, Jan. 2000.

* cited by examiner

SYSTEM AND METHOD FOR RESPONDING TO RESOURCE REQUESTS IN DISTRIBUTED COMPUTER NETWORKS

CROSS-REFERENCE TO RELATED APPLICATIONS

This application is related to the inventor's application "SCALABLE RESOURCE DISCOVERY AND RECONFIGURATION FOR DISTRIBUTED COMPUTER NETWORKS," Ser. No. 09/850,343, now 20020165948, which was filed on the same day as the present application and commonly assigned herewith to International Business Machines Corporation. This related application is incorporated herein by reference.

BACKGROUND OF THE INVENTION

1. Field of the Invention

The present invention relates to computer networks, and more specifically to a system and method for responding to a resource request in a distributed computer network.

2. Description of Related Art

Computer networks such as the Internet allow users to share resources such as files and hardware. The expansion of the Internet and the adoption of standards for the World Wide Web have made the viewing and downloading of files by a user almost effortless. The user need not know any programming languages. By simply running an Internet browser, the user only needs to point and click to view and download desired files. The availability of such programs allows for easy collaboration and file sharing among like-minded individuals separated by great distances over a distributed computer network, which can literally span the entire globe.

Conventionally, a distributed computer network is set up to have a client/server framework. In particular, each user is a client that can access a server node over the network and, with the proper authorization, publish files to the server node. Once a file is published to the server node, other clients on the network can access the server node to view or download the file. Additionally, the server node can allow a client to automatically send a file to another client that is reachable over the network. The client simply sends the file to the server node along with information identifying the desired recipient, and the server node sends the file on to the corresponding client. The server node can also be used to allow the clients to share hardware resources such as a printer.

With such a client/server framework, the server node is charged with providing security. For example, the server node must insure that only authorized clients can use the network resources (e.g., download files), and that only proper files are published. Additionally, the server node represents a single point of failure. Thus, in any client/server environment in which reliability is required, the server node must be of industrial strength and have redundant systems to prevent system shutdowns and data loss. Further, because all client-to-client resource transfers pass through the server node, the adding of another client to the network puts an additional burden on the server node and degrades network performance.

In such a client/server framework, the clients have little privacy. Typically, the server node requires authentication before allowing a client to access network resources. Once the client has provided authentication credentials, the server node can easily log all of the network activity of the client. For example, the server node could keep a log of all files uploaded and downloaded by the client. Even if access by unauthenticated clients is allowed, the server node can use any of various unique identification techniques to track client activity over time. For example, the server node can place a unique cookie on the client and later use the cookie to identify the client each time it accesses the server node.

One solution to some of the drawbacks of the conventional client/server framework is provided by a "viral" network. In such a network, a user node connects to one or more known hosts that are participating in a highly interconnected virtual network. Then, the user node itself becomes a host node that can respond to requests for resources and available hosts. Each user in the network forwards resource requests to all known neighboring nodes, so as to potentially propagate each request throughout the entire network. For example, the Gnutella system employs such a viral network framework. Gnutella has a published network protocol and provides users a client/server application (available at http://gnutella.wego.com) that allows each user to act as a host node in a file sharing network. The Gnutella system can be used to securely distribute commercial content that is protected by encryption and licensing.

Viral networks are based on peer-to-peer communication. Peer-to-peer is a communications model in which each party has similar capabilities and either party may initiate a communication session. For example, the Gnutella application employs peer-to-peer communication to allow users to exchange files with one another over the Internet. The peer-to-peer model used in a viral network relies on each peer (i.e., user node) having knowledge of at least one of the other peers in the network. When searching for are source such as a file, a peer sends a resource request to other known peers, which in turn pass it on to their known peers and so on to propagate the request throughout the network. A peer that has the resource and receives the request can send the resource (or a message indicating its availability) back to the requesting peer. Because such a framework offers independence from a centralized network authority (e.g., server node), users in a viral network have enhanced privacy and the single point of failure is eliminated.

FIG. 1 shows an exemplary viral network. Each node in the network represents a user that acts both as a client and host, and is connected with one or more other nodes. When a first node 210 desires a particular resource (e.g., file), the first node 210 issues a request to all known nodes 202, 204, 206, and 208, which in turn do the same. For example, the request reaches a second node 212 by being passed in succession through nodes 208, 216, and 218. If the second node 212 has the requested resource, it responds by sending an appropriate message to the first node 210 (e.g., back the same path that the request traversed). Because a node having the requested resource has been identified, the first node 210 can initiate a direct peer-to-peer connection with the second node 212 in order to download the resource. Throughout the viral network, any number of such resource requests, acknowledgments, and transfers can occur simultaneously.

While viral networks offer enhanced privacy and eliminate a single point of failure, the framework has drawbacks related to scalability. In a large, decentralized viral network, efficient resource discovery breaks down as the number of participating nodes increases. More specifically, a resource request can only propagate from node to node, and each node only propagates the request to a relatively small number of other nodes. To control network traffic and prevent unreasonable response times, a practical system must employ a "time-to-live" or some limit on the number of times a request can be forwarded (i.e., a maximum number of peer hops). This effectively disconnects any two nodes or groups of nodes that are separated by a path that would require a request to propagate through an unreasonably large number of intermediary nodes. Further, any such limit on request propagation makes it impossible to perform an exhaustive search for a resource, because such a search would require the request to be propagated to all of the nodes in the network.

Additionally, there has recently been proposed a content-based publish-subscribe messaging infrastructure that utilizes an information flow graph. For example, the Gryphon system (described at http://www.research.ibm.com/gryphon) has been developed by the assignee of the present invention. This system provides a content-based subscription service and performs message brokering by merging the features of distributed publish/subscribe communications and database technology. At the core of the Gryphon system is an information flow graph that specifies the selective delivery of events, the transformation of events, and the generation of new events.

FIG. 2 shows an exemplary content-based publish-subscribe messaging infrastructure that utilizes information flow graphs. In this system, stocks trades derived from two information sources NYSE and NASDAQ are combined, transformed, filtered and delivered to subscribing clients. For example, one user 312 may subscribe to the message-brokering server 302 and request to receive all stock trades on both the NYSE and NASDAQ that have a value of over one million dollars. The message broker 302 receives raw stock trade information such as price and volume from the NYSE 324 and NASDAQ 326.

Based on the information request of the user 312, the server 302 merges the stock trade information from the two sources, transforms the raw price and volume information into value information for each trade, and then filters the derived values to produce the subset of trades that are valued at over one million dollars. In a similar manner, each subscribing user (e.g., nodes 304, 306, and 308) specifies its own criteria, and the message-brokering server 302 performs information selection, transformation, filtering, and delivery in order to provide each user with the requested information.

While the publish-subscribe messaging infrastructure of FIG. 2 provides good scalability for a messaging system with a large number of users, as in the conventional client/server framework the users have little privacy. All users must identify themselves when subscribing to the system and all information is delivered to the user through the centralized server. Thus, the centralized server can easily maintain a log of all users of the system and the exact information that each desires and receives. The centralized message-brokering server also represents a single point of failure for the system.

SUMMARY OF THE INVENTION

In view of these drawbacks, it is an object of the present invention to remove the above-mentioned drawbacks and to provide systems and methods for responding to a resource request in a distributed computer network.

One embodiment of the present invention provides a method Corresponding to a resource request from a requesting user node in a network of user nodes. According to the method, a response to the resource request is received at a first user node of the network, and it is determined whether or not to send the response back to the requesting user node. When it is determined not to send the response to the requesting user node, the response is forwarded to a second user node of the network through a direct connection. When it is determined to send the response to the requesting user node, the response is sent back to the requesting user node. In a preferred embodiment, the determination of whether or not to send the response to the requesting user node is a random decision made by the first user node.

Another embodiment of the present invention provides a user node for use in a computer network of the type that includes user nodes that are each connected to at least one other user node through a direct connection. The user node includes a receiving interface for receiving a response to a resource request from a requesting user node, control means for deciding whether or not to send the response back to the requesting user node, and at least one transmitting interface for selectively forwarding the response to a second user node of the network through a direct connection or sending the response back to the requesting user node. The transmitting interface forwards the response to the second user node when the control means decides not to send the response back to the requesting user node, and sends the response back to the requesting user node when the control means decides to send the response back to the requesting user node. In one preferred embodiment, the control means randomly selects one of the other user nodes of the network to be the second user node to which the response is forwarded.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
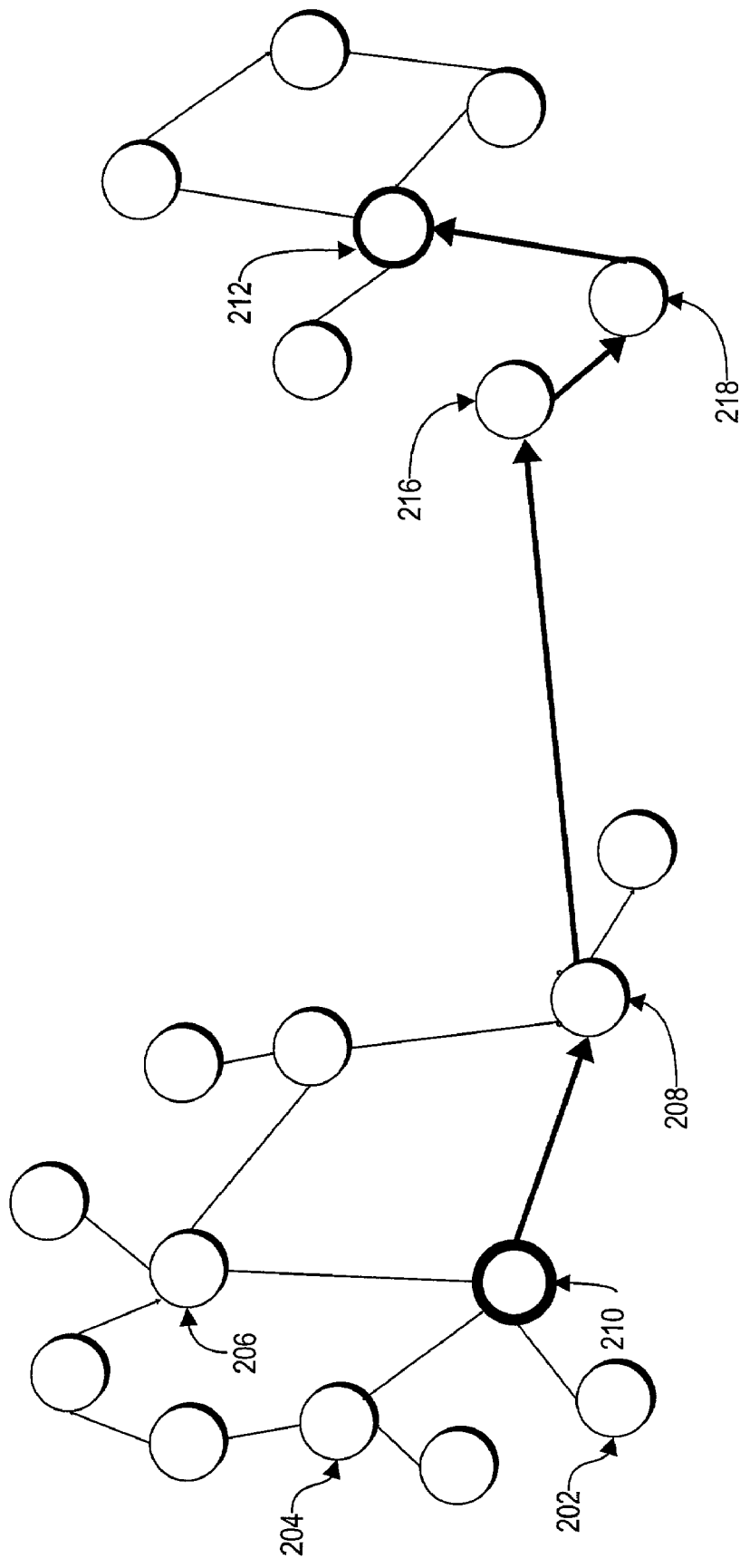
FIG. 1 is a diagram of an exemplary viral network.
Figure 2:
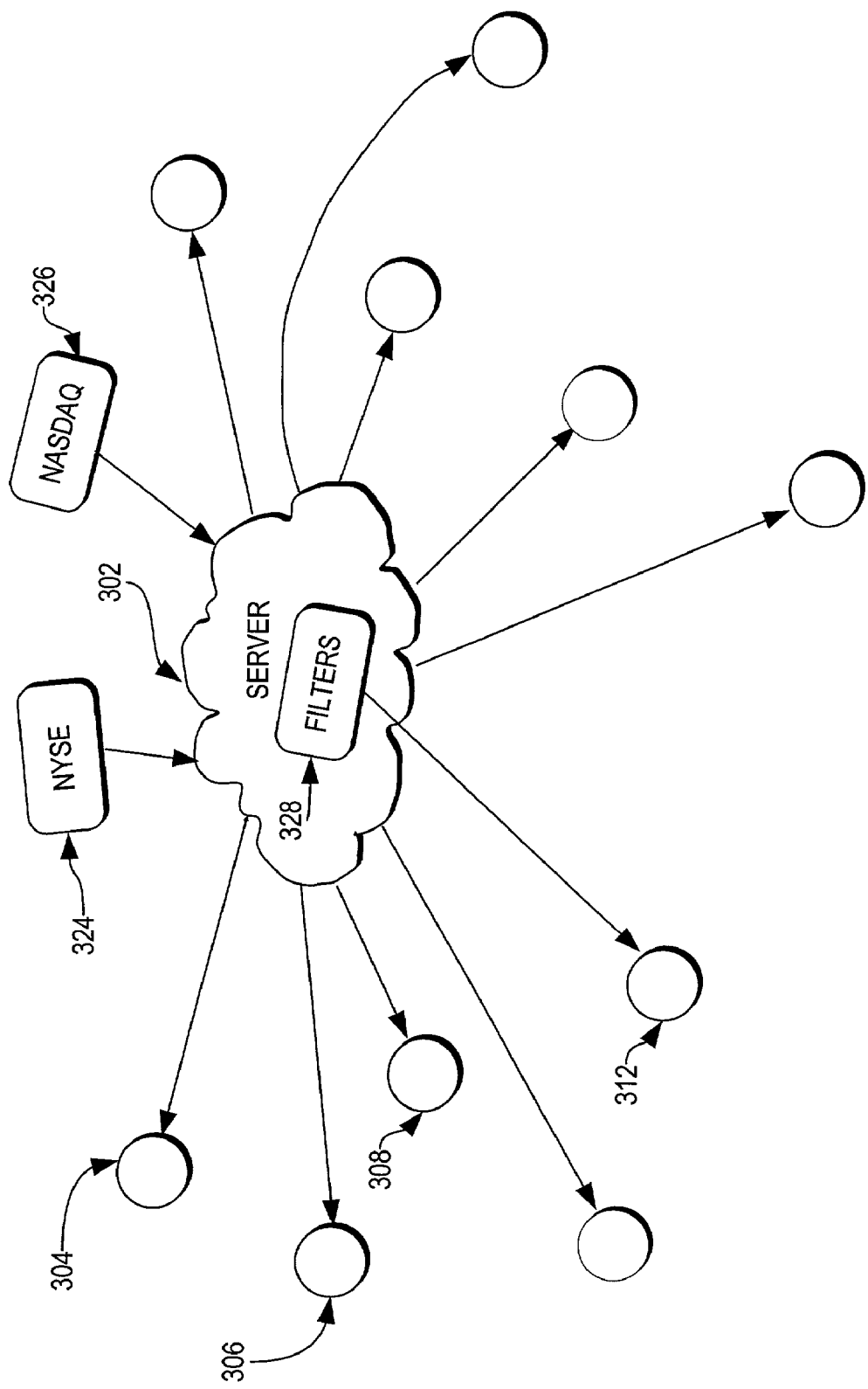
FIG. 2 is a diagram of an exemplary content-based publish-subscribe messaging infrastructure.
Figure 3:
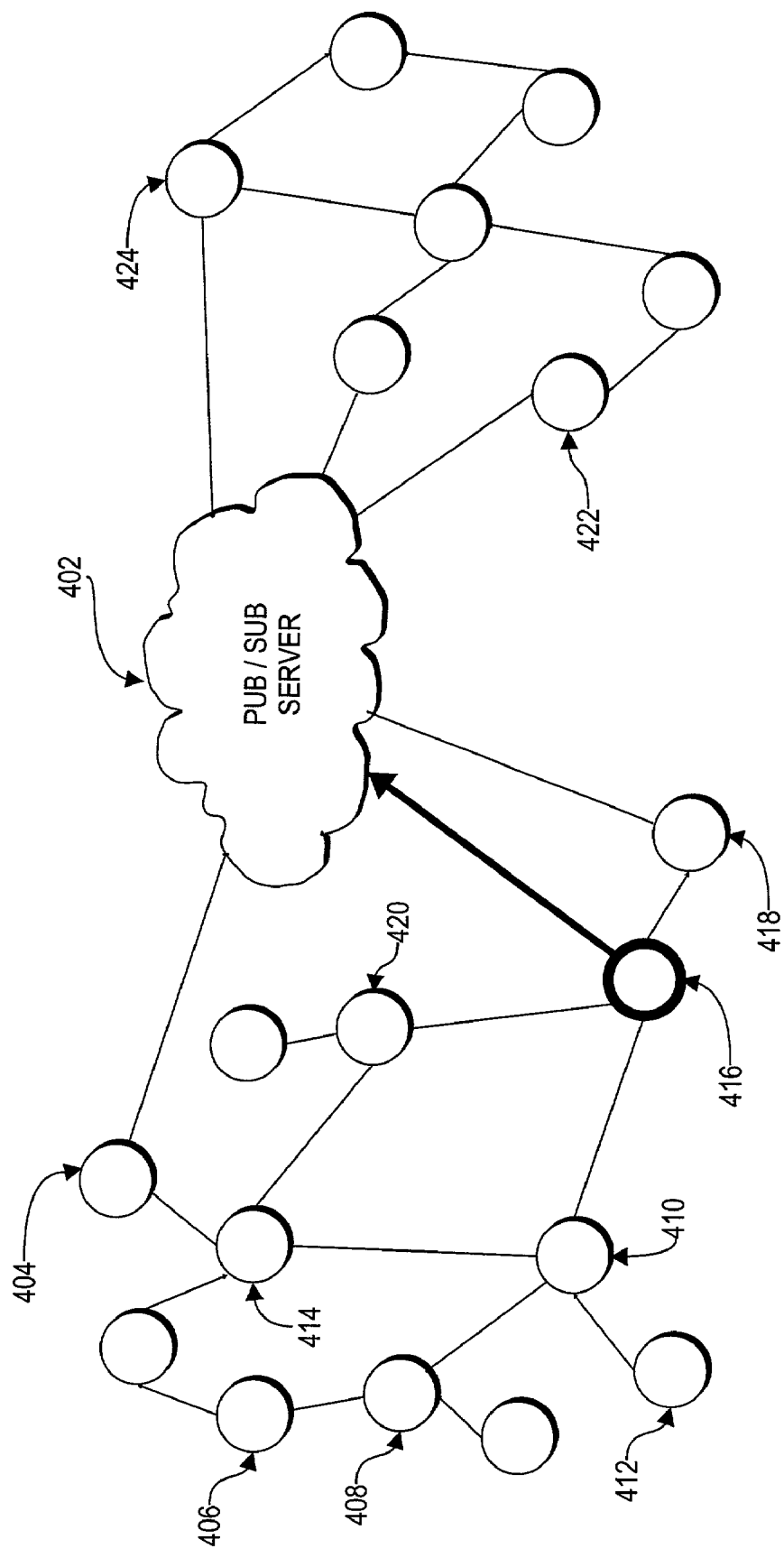
FIG. 3 is a diagram of scalable network framework according to a preferred embodiment of the present invention.

FIG. 3 shows a scalable network framework according to a preferred embodiment of the present invention. As shown, the framework includes a publish-subscribe server node 402 and multiple user nodes (e.g., 404, 406, and 410). In embodiments of the present invention, the server node 402 can be implemented by a single server or by a "server cloud" that is made up of any number of servers. The individual servers of such a server cloud can be connected to one another and to the Internet in various ways and can even be separated by great distances so as to provide an appropriate level of service and advantageous features such as data and path redundancy.

Within this framework, a user node 416 joins the network by contacting the publish-subscribe server node 402 and subscribing to certain "channels" of messages. Additionally, the joining user node 416 solicits connections and then directly connects with at least one other user node 410, 418, and 420 (e.g., based on some criteria such as geographic location, connection speed, or common interests). In this manner, all of the user nodes in the network are connected to the centralized publish-subscribe server node for messaging (not shown for clarity) and to one another through peer-to-peer connections that form a decentralized viral-type resource sharing network.

Figure 4:
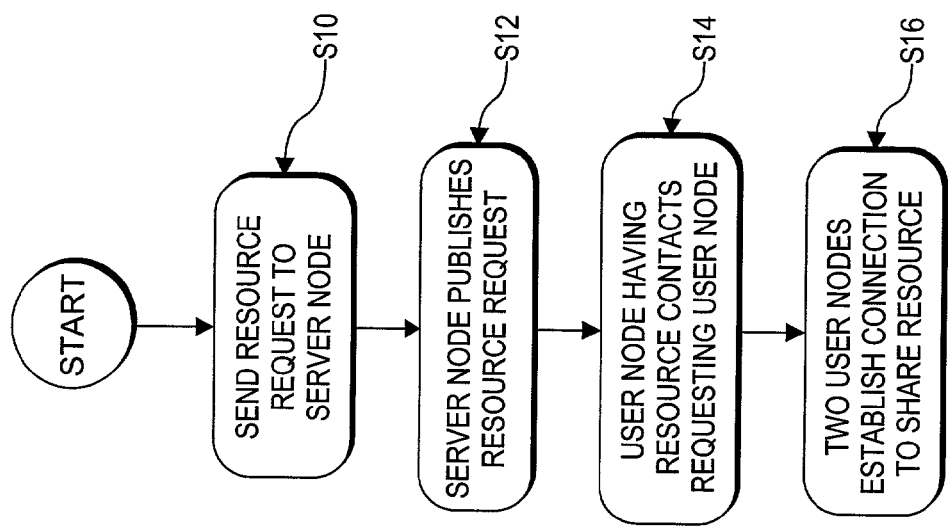
FIG. 4 is a flow chart of a process for obtaining a resource within a scalable network framework in accordance with a first embodiment of the present invention.

FIG. 4 is a flow chart of a process for obtaining a resource within such a scalable network framework in accordance with a first embodiment of the present invention. Whenever a first user node 416 in the network desires a resource (e.g., file), a resource request (or query) is sent to the server node 402 (step S10), and the server node 402 publishes the resource request by sending it to all of the user nodes that are subscribed to the channel corresponding to that type of request (step S12). A second user node 422 that receives the request and is willing to provide the resource contacts the first user node 416 (step S14), and the first and second user nodes 416 and 422 set up a peer-to-peer connection to provide the requested resource to the first user node 416 (step S16). In this manner, the publish-subscribe messaging infrastructure layer allows a resource request to reach nodes that are separated from the requesting node by a direct-connect path that includes a very large number of intermediary nodes.

Thus, in the scalable network framework provided by the present invention, efficient resource discovery is maintained when the number of user nodes in the network increases. At the same time, the resources themselves are not published to the server and the actual resource sharing does not involve the server, so the demands on the server are less than in the conventional client/server framework. Furthermore, because each search request is published to all of the user nodes that subscribe to the relevant channel, it is possible to perform an exhaustive (or at least very extensive) search for the requested resource within an acceptable time frame in a network that contains a very large number of user nodes.

In preferred embodiments, the publish-subscribe messaging infrastructure supports two types of "channels", or shared data streams. The first type of channel is a "node discovery channel" that is used to support the discovery of other user nodes in the decentralized network. To join the network, a user node announces itself using the publish-subscribe messaging infrastructure of the server node. In particular, a join announcement from the new user node is routed via the server node to one or more of the node discovery channels to solicit connections from other user nodes. Thus, the publish-subscribe infrastructure functions as a general purpose transport layer (like a layer above IP) that establishes connections to other user nodes to accomplish the broadcasting of join announcements.

Such join announcements can be divided among individual node discovery channels based on categories such as geographic location, network connection speed, types of resources available, and/or common interests. Thus, the new user node can discover remote user nodes (both geographically and with a respect to network hops) and when connecting can favor nodes with the desired type of resources or acceptable connectivity attributes. Further, because each join announcement is only sent to the user nodes subscribed to certain channels, the user nodes of a very large network are not constantly flooded with join announcements.

The second type of channel is a "resource request channel" that is used to optimize the publication of resource requests. As explained above, the server node publishes each resource request by sending it to all of the user nodes that are subscribed to a particular channel (or channels). These resource request channels can be divided into a rich taxonomy of resource types in order to allow the user nodes to effectively filter out undesired requests. Further, rather than reaching every user node in the network, the use of resource request channels allows a resource request to only reach a relevant subset of user nodes (i.e., those that subscribe to the relevant channel or channels).

Thus, a user node that only desires to share technical documentation is not bombarded with requests for multimedia content. Depending on the application, the user node and/or the server node can determine the channel or channels on which to publish an individual announcement or resource request. Further, in preferred embodiments, a channel exists merely by virtue of being published to by a user node. Thus, any user node can create a new resource channel and then promote its availability for subscription in any conventional manner (e.g., through a web site, newsgroup, television, or direct mail advertising).

Figure 5:
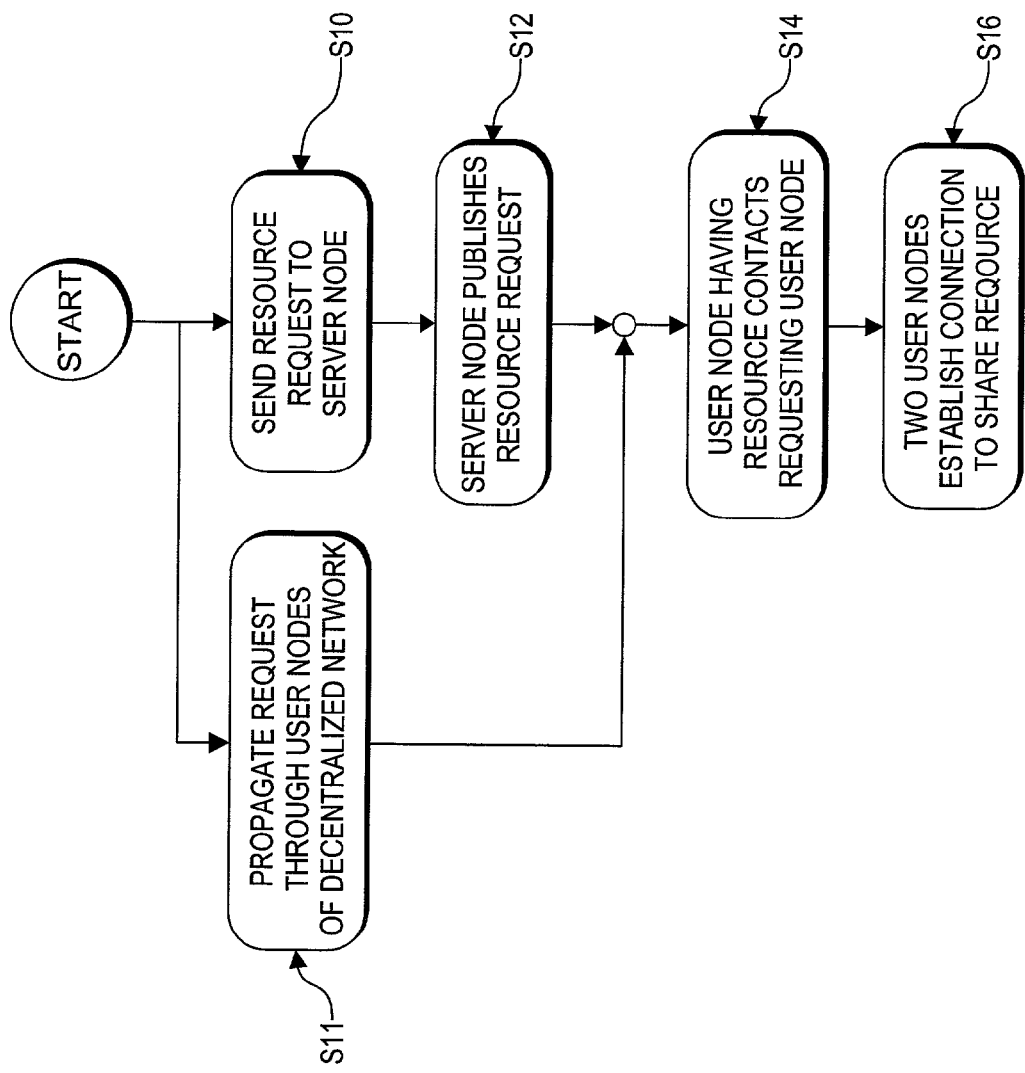
FIG. 5 is a flow chart of a process for obtaining a resource within a scalable network framework in accordance with a second embodiment of the present invention.

FIG. 5 is a flow chart of a process for obtaining a resource within a scalable network framework in accordance with a second embodiment of the present invention. Whenever a first user node 416 in the network desires a resource (e.g., file), a resource request is sent to the server node 402 (step S10), and the server node 402 publishes the resource request by sending it to all of the user nodes that are subscribed to the channel corresponding to that type of request (step S12). Additionally, in the second embodiment the first node 416 also sends the resource request to all of the user nodes 410, 418, and 420 to which it is connected in the decentralized network.

This process is repeated with each user nodes that receives the request passing it on to the user nodes to which it is connected, so as to propagate the request through the user nodes of the decentralized network (step S11). For example, the request reaches a second user node 404 by being passed in succession through nodes 410 and 414. Further, in some embodiments each user node that receives the resource request from the server node (e.g., user node 422) also sends the resource request to all of the user nodes to which it is connected in the decentralized network. If the second user node 404 receives the request (either through user node propagation or from the server node) and is willing to provide the resource, the second user node 404 contacts the first user node 416 (step S14), and a peer-to-peer connection is set up to share the requested resource (step S16).

Thus, in the second embodiment resource requests are both published through the messaging infrastructure layer (as in the first embodiment) and propagated through the user nodes of the decentralized network. Because this dual path process offers an alternative to the request propagation path that passes through the centralized server node, the single point of failure is eliminated. In other words, the resource request is propagated to other user nodes even when the server node is down. Further, in the second embodiment, it is not necessary for all of the user nodes to be connected to, or even know about the presence of, the publish-subscribe infrastructure. Such a user node can merely forward resource requests to all of the user nodes to which it is connected. This feature allows the second embodiment to be implemented in an existing network without requiring the modification of all user nodes.

Figure 6:
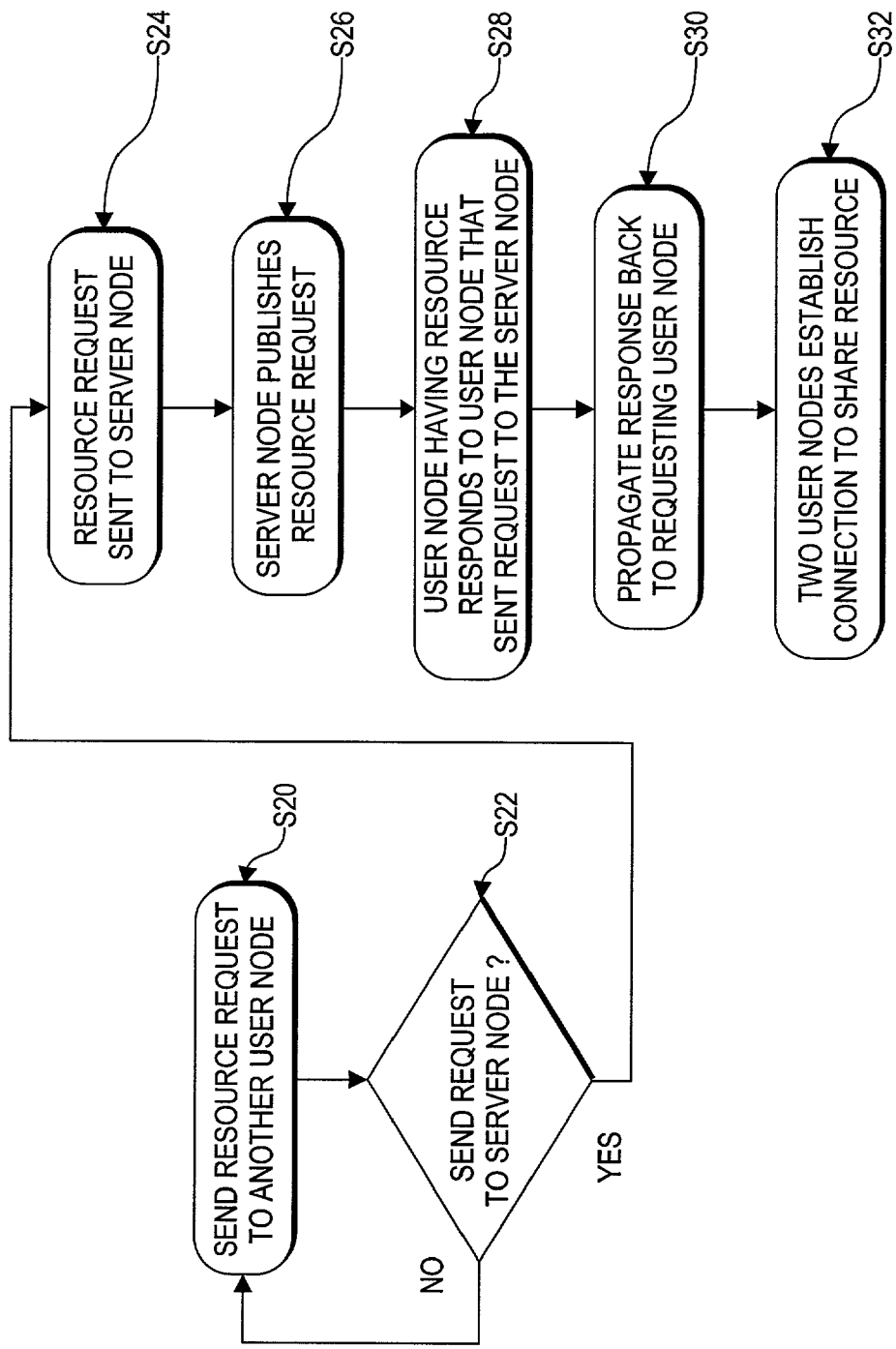
FIG. 6 is a flow chart of a process for obtaining a resource within a scalable network framework in accordance with a third embodiment of the present invention.

FIG. 6 is a flow chart of a process for obtaining a resource within such a scalable network framework in accordance with a third embodiment of the present invention. In this embodiment, resource requests are not sent directly to the server node in order to give enhanced privacy to the requesting user node. Whenever a resource (e.g., file) is desired in the third embodiment, the requesting first user node 410 sends a resource request to a second user node 414 to which it is connected in the decentralized network (step S20), as shown by the dashed arrows in FIG. 7. The second user node 414 then determines whether to send the request to the publish-subscribe server node 402 or to another user node to which it is connected in the decentralized network (step S22). Preferably, all of the user nodes are connected to the centralized publish-subscribe server node for messaging (not shown for clarity).

Figure 7:
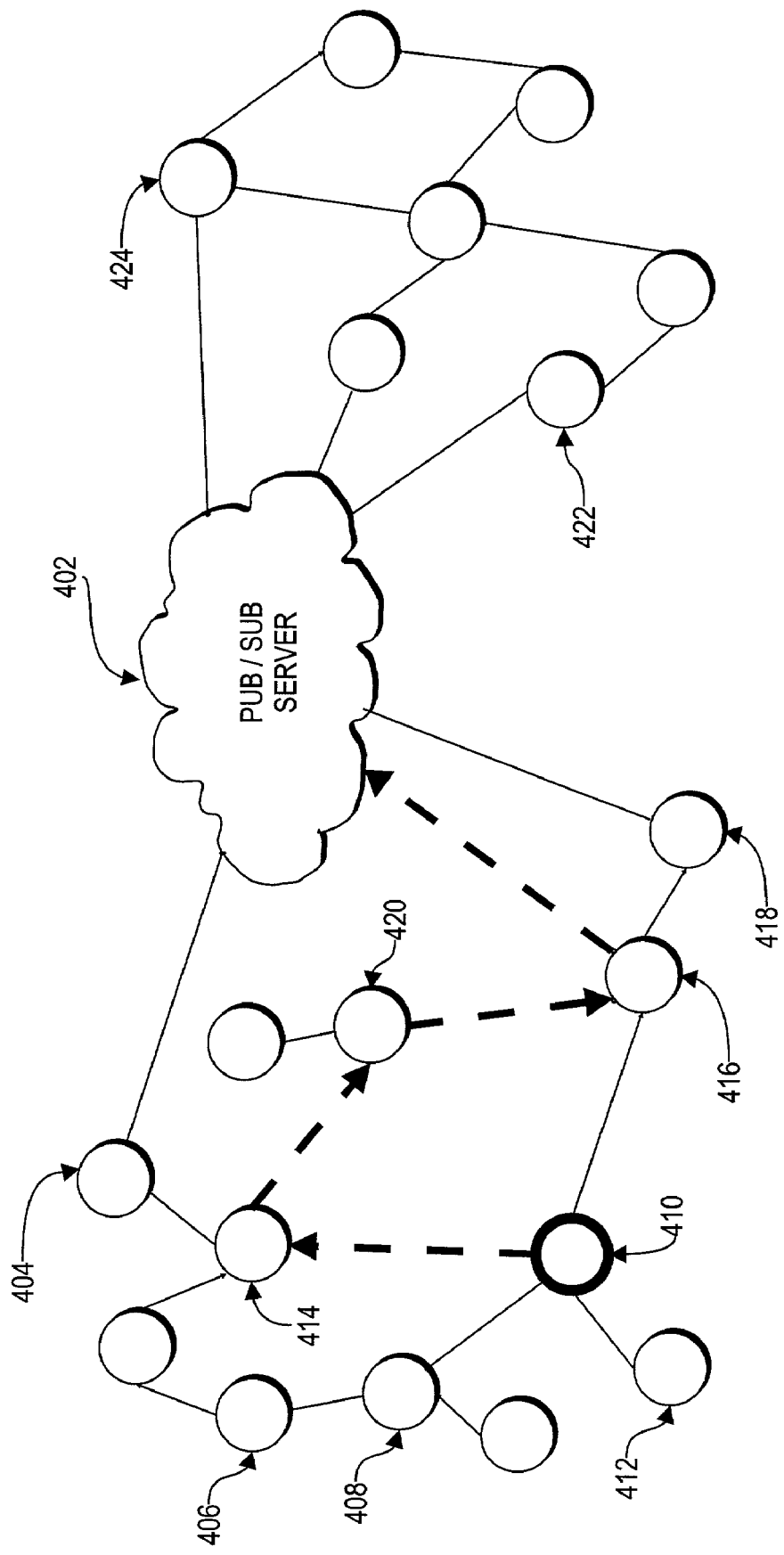
FIG. 7 is a diagram of scalable network framework showing an exemplary implementation of part of the process of FIG. 6.

If it is decided not to send to the server node 402, then the second user node 414 forwards the resource request to another user node 420 to which it is connected (step S20), as shown in FIG. 7. This forwarding process is repeated with each user node that receives the resource request making the same determination (step S22). When a third user node 416 decides to send to the server node 402, the resource request is sent to the server node 402 (step S24), and the server node 402 publishes the resource request by sending it to all of the user nodes that are subscribed to the channel corresponding to that type of request (step S26).

In preferred embodiments, each determination of whether or not to send the request to the publish subscribe server node is a "random" decision made by the user node based on a weighting factor of between 0 and 1 that gives the probability that the request will be sent to the server node. For example, if the weighting factor is 0.25, then there is a 25% chance that the user node will send the request to the server node and a 75% chance that the request will be forwarded to another user node. Thus, on average a weighting factor of 0.25 should cause resource requests to be forwarded to other user nodes three times before being sent to the publish-subscribe server node. The value of the weighting factor is set based on factors such as the desired level of privacy. Further, the weighting factor can be a fixed value that is used throughout the network or can be set by the user nodes on a per message basis. Other criteria such as a maximum number of forwards or a maximum elapsed time can also be incorporated into the determination that is made by each user node receiving the request.

In further embodiments, the determination of whether or not to send the request to the publish-subscribe server node is made based on some other criteria such as a fixed number of forwards. For example, in one embodiment each resource request is always forwarded through three user nodes and then sent to the publish-subscribe server node. Preferably, whenever a resource request is to be forwarded on to another user node, the choice of which other user node will receive the forwarded request is made through a random selection of one of the user nodes to which the forwarding user node is connected.

Figure 8:
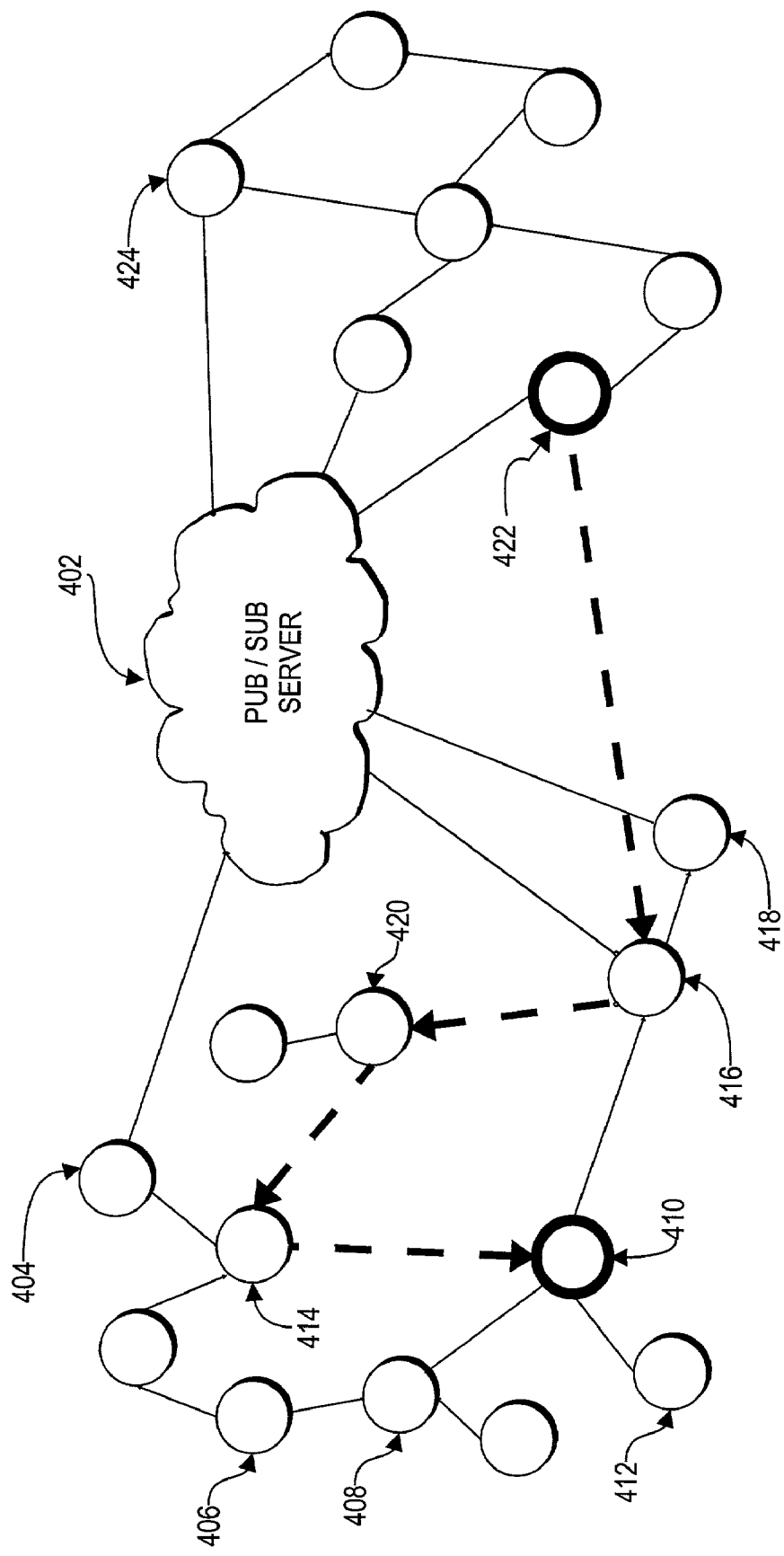
FIG. 8 is a diagram of scalable network framework showing an exemplary implementation of another part of the process of FIG. 6.

After the resource request is published by the server node 402, a fourth user node 422 that receives the request and is willing to provide the resource contacts the first user node 410. More specifically, as shown in FIG. 8 the fourth user node 422 sends a response to the third user node 416 (step S28), which had sent the resource request to the server node 402 for publication. The third user node 416 forwards the response to the user node 420 from which it received the resource request, and this forwarding process is repeated until the response reaches the first user node 410 (step S30). At this point, the first user node 410 can contact the fourth user node 422 to set up a direct peer-to-peer connection to share the requested resource (step S32).

In preferred embodiments, the response from the user node having the resource contains metadata concerning the resource match. When the response is received, the requesting user node evaluates the metadata and then decides whether to make a direct connection with the responding node to share the resource itself (e.g., download the requested file). If multiple responses are received, the requesting user node can evaluate the metadata in each response and then select one or more of the responding user nodes based on any criteria (e.g., past experience, order received, connection speed, or physical location).

Additionally, in preferred embodiments, responses from user nodes having the resource are routed through existing connections (such as the one the request had traversed through the server node), and a new point-to-point connection is only established to actually transfer the resource. Otherwise, with each responding user node initiating a new point-to-point connection, the user node receiving the responses could be overwhelmed whenever a large number of responses are received. Alternatively, the server node could set up a matching "one-time" response channel or a permanent response channel to be used by user nodes responding to the resource request. The publishing of responses over a permanent response channel would facilitate "passive" user nodes that archive responses of possible interest for future use.

Because resource requests are forwarded through one or more other user nodes rather than being sent directly to the server node, the third embodiment offers privacy to requesting user nodes. The actual user node requesting a resource remains anonymous to the server node, so the server node cannot keep track of which users are sharing (or even requesting) which resources. As in a conventional viral network, in the third embodiment only a user node that actually provides the resource has knowledge of the resource sharing and the identity of the requesting node. Further, unlike a conventional viral network, in the third embodiment the use of a publish-subscribe messaging infrastructure layer allows for efficient resource discovery in a network having a very large number of user nodes. Thus, the present invention allows scalability to be achieved in a decentralized network while enhanced user privacy is maintained.

Figure 9:
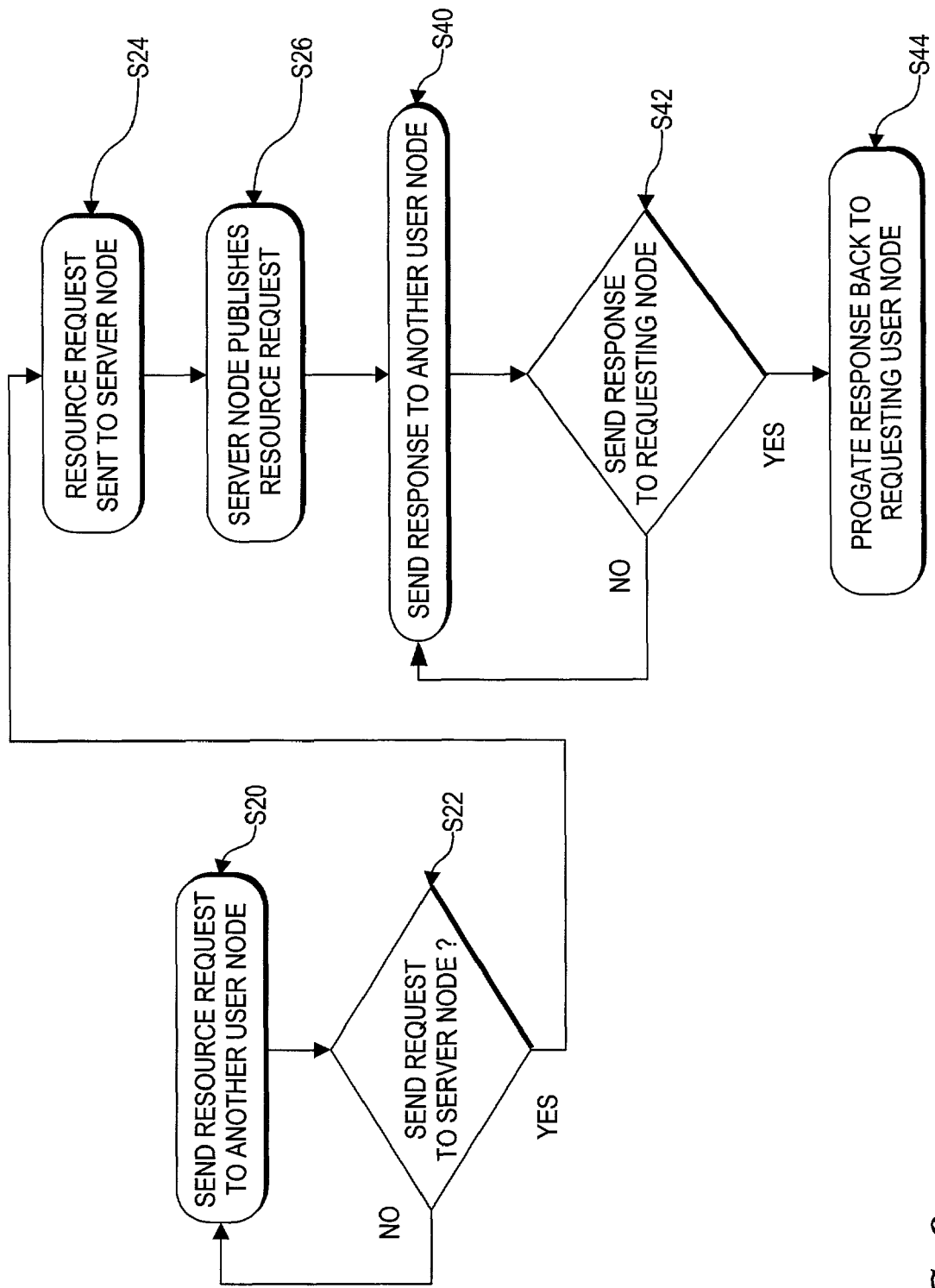
FIG. 9 is a flow chart of a process for providing a requested resource within a scalable network framework in accordance with a fourth embodiment of the present invention.

FIG. 9 is a flow chart of a process for providing a requested resource within a scalable network framework in accordance with a fourth embodiment of the present invention. In this embodiment, responses to resource requests are not propagated directly back to the requesting user node in order to give enhanced privacy to the responding user node. Whenever a resource (e.g., file) is desired, the requesting first user node 410 sends a resource request to a second user node 414 to which it is connected in the decentralized network (step S20), as shown by the dashed arrows in FIG. 7. As in the third embodiment, the second user node 414 then determines whether to send the request to the publish-subscribe server node 402 or to another user node to which it is connected in the decentralized network (step S22).

If it is decided not to send to the server node 402, then the second user node 414 forwards the resource request to another user node 420 to which it is connected (step S20), as shown in FIG. 7. This forwarding process is repeated with each user node that receives the resource request making the same determination (step S22). When a third user node 416 decides to send to the server node 402, the resource request is sent to the server node 402 (step S24), and the server node 402 publishes the resource request by sending it to all of the user nodes that are subscribed to the channel corresponding to that type of request (step S26).

After the resource request is published by the server node 402, a fourth user node 422 that receives the request and is willing to provide the resource prepares a response. As explained above, the response from the fourth user node 422 is not sent directly back in this embodiment. Instead, the fourth user node 422 sends the response to a fifth user node 426 to which it is connected in the decentralized network (step S40), as shown by the dashed arrows in FIG. 10. Similar to the process for propagating the resource request, the fifth user node 426 determines whether to send the response back to the requesting user node 410 or on to another user node to which it is connected in the decentralized network (step S42).

Figure 10:
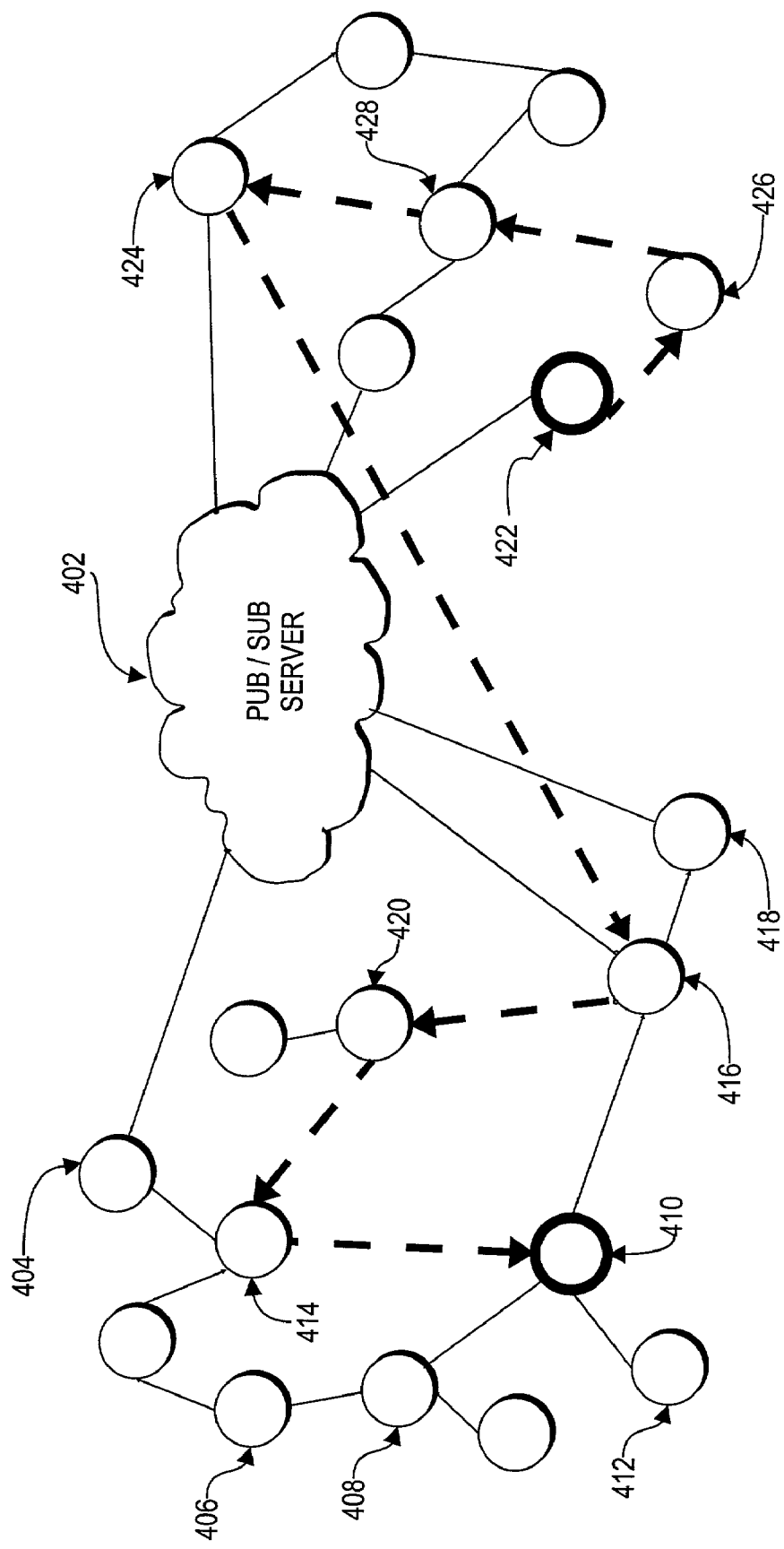
FIG. 10 is a diagram of scalable network framework showing an exemplary implementation of part of the process of FIG. 9.

If it is decided not to send to the requesting user node 410, then the fifth user node 426 forwards the response to another user node 428 to which it is connected (step S40), as shown in FIG. 10. This forwarding process is repeated with each user node that receives the response making the same determination (step S42). When a sixth user node 424 decides to send to the response to the requesting user node 410, the response is propagated back to the requesting user node 410 (step S44). More specifically, in the exemplary embodiment shown in FIG. 10, the sixth user node 424 sends the response directly to the third user node 416, which had sent the resource request to the server node 402 for publication.

Figure 11:
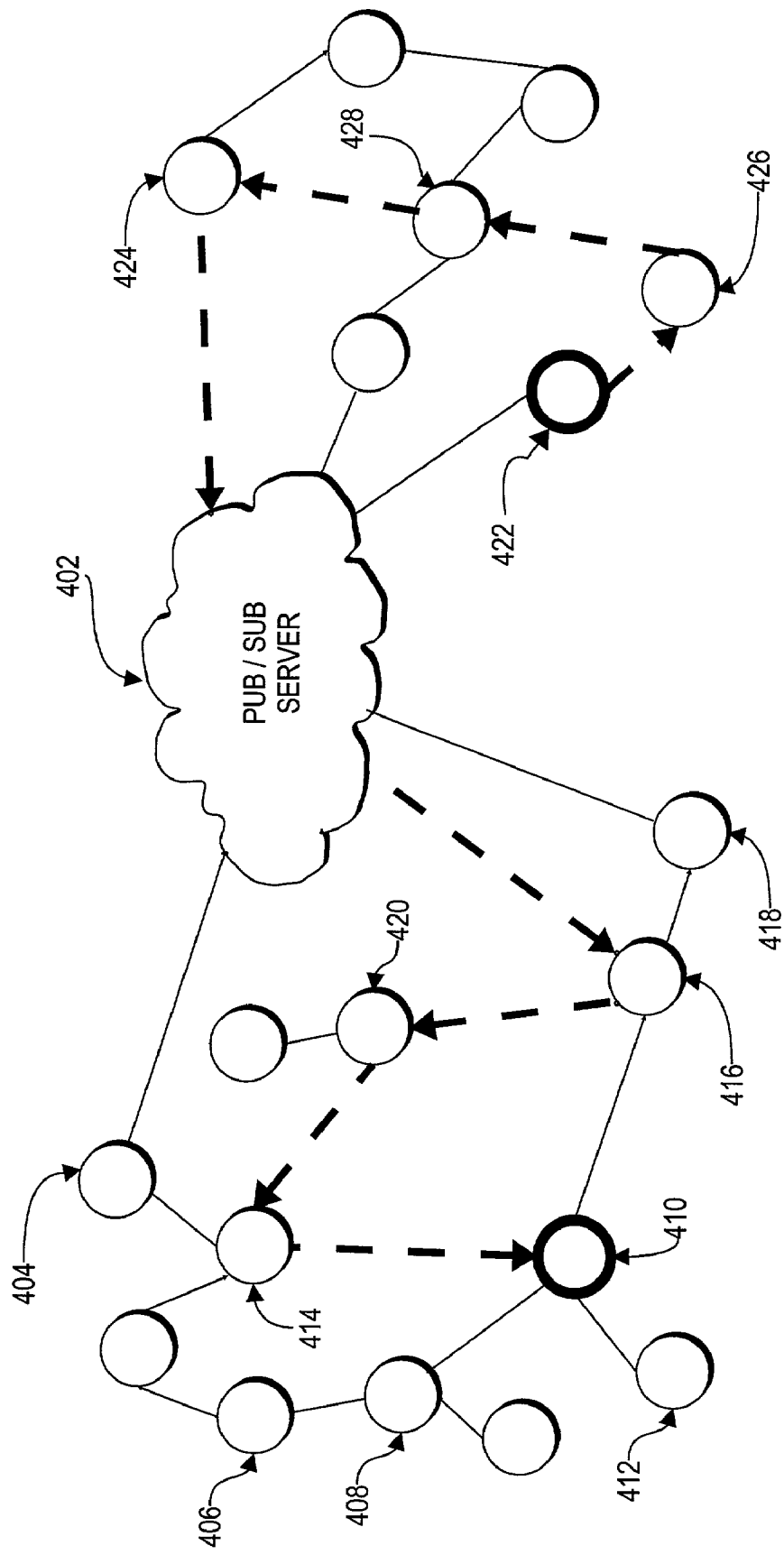
FIG. 11 is a diagram of scalable network framework showing an alternative implementation of part of the process of FIG. 9.

In an alternative embodiment shown in FIG. 11, the sixth user node 424 sends the response to the third user node 416 via the server node 402. While still keeping the source of the response anonymous, this alternative allows the server node to gain some knowledge about responses in general. In either case, the third user node 416 then forwards the response back to the user node 420 from which it received the resource request, and this forwarding process is repeated until the response reaches the first user node 410 that had made the original request.

In preferred embodiments, the response from the user node having the resource contains the actual resource itself (e.g., the requested file). Thus, when the response reaches the requesting user node, the resource is instantly available and there is no need for further action to share the resource. Additionally, this provides a high level of anonymity to the responding node. In further embodiments, the response contains metadata concerning the resource match. When the response is received, the requesting user node evaluates the metadata and then decides whether to retrieve the resource itself from the responding user node. In such embodiments, the resource can be retrieved from the responding user node in a variety of ways.

For example, the requesting user node 410 could send an acceptance back to the responding user node 422 using a direct connection with the sixth user node 424, which had sent the response to the third user node 416 for propagation back to the requesting user node 410. Alternatively, the requesting user node 410 could propagate the acceptance back to the responding user node 422 along the same path that the response had traversed (i.e., through nodes 414, 420, 416, 424, 428, and 426). Further, for greater privacy, the requesting user node 410 could again employ the indirect forwarding process so that the acceptance is forwarded through one or more other user nodes before being sent to the sixth user node 424 for propagation back to the responding user node 422. When the acceptance is received, the responding user node 422 has an analogous set of response alternatives that can be used to propagate the actual resource back to the requesting user node 410.

In a further embodiment, the requesting user node includes a "one-time" public key with the resource request, and the responding user node encrypts the response so that it can only be read by the requesting user node. Thus, the responding user node can identify itself in the response and still remain anonymous to all except the requesting user node. Additionally, this embodiment allows the requesting user node to directly contact the responding user node to set up a peer-to-peer connection for sharing the requested resource.

As with resource requests, it is preferable to have responses routed through existing connections or a matching response channel in order to prevent a user node from being overwhelmed whenever a large number of responses are received. Likewise, preferably each determination of whether or not to send the response back to the requesting user node is a "random" decision made by the user node based on a weighting factor that represents the probability that the request will be sent back to the requesting user node. However, other criteria (such as a maximum number of forwards or a maximum elapsed time) can also be incorporated into the determination that is made by the user node, or the determination can be based solely on some other criteria (such as a fixed number of forwards). Furthermore, whenever a response is to be forwarded onto another user node, the choice of which other user node will receive the forwarded response is preferably made through a random selection of one of the user nodes to which the forwarding user node is connected.

Because responses are forwarded through one or more other user nodes rather than being propagated directly back to the requesting user node, the fourth embodiment offers privacy to responding user nodes. The actual user node that is providing (or is willing to provide) the resource remains anonymous to the requesting user node and the server node. Thus, neither the requesting user node nor the server node can keep track of which users are providing (or even just possess) which resources. In fact, with the fourth embodiment, it is possible to prevent the responding node from knowing the identity of the requesting node and to prevent the requesting node from knowing the identity of the responding node. Further, unlike a conventional viral network, in the fourth embodiment the use of a publish-subscribe messaging infrastructure layer allows for efficient resource discovery in a network having a very large number of user nodes. Thus, the present invention allows scalability to be achieved in a decentralized network while enhanced user privacy is maintained.

The embodiments of the present invention described above require some mechanism for identifying individual messages. In preferred embodiments, every message (i.e., resource request or response) is assigned a unique identification number. For example, one embodiment employs an algorithm developed by Microsoft Corporation that allows each user node to individually generate globally-unique message identifiers (GUIDs) that are very likely to be globally unique.

Additionally, each user node must store (e.g., in a table) at least a limited history of forwarded messages in order to allow responses (possibly including the resource itself) to reach the user node that sent a message through the same path. Further, some embodiments include a mechanism to prevent the looping of a resource request. For example, the globally-unique message identifiers GUIDs and node history tables can easily be used to create an anti-looping mechanism.

While the embodiments of the present invention described above relate to a single server node, multiple publish-subscribe server nodes can be provided in the network to further minimize "point of failure" concerns. Further, competing providers may coexist in the network by operating different server nodes and competing for user node subscriptions. Additionally, the features of the different embodiments described above can be combined for further applications. For example, one embodiment of the present invention includes both the randomized response forwarding of the fourth embodiment and the dual propagation/publication of the second embodiment. Other design choices, such as network protocols, forwarding criteria, and membership criteria, could easily be adapted.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when loaded and executed, controls the computer system such that it carries out the methods described herein.

The present invention can also be embedded in a computer program product, which comprises all the features enabling the implementation of the methods described herein, and which—when loaded in a computer system—is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

Each computer system may include one or more computers and a computer readable medium that allows the computer to read data, instructions, messages, or message packets, and other computer readable information from the computer readable medium. The computer readable medium may include non-volatile memory such as ROM, Flash memory, a hard or floppy disk, a CD-ROM, or other permanent storage. Additionally, a computer readable medium may include volatile storage such as RAM, buffers, cache memory, and network circuits. Furthermore, the computer readable medium may include computer readable information in a transitory state medium such as a network link and/or a network interface (including a wired network or a wireless network) that allow a computer to read such computer readable information.

While there has been illustrated and described what are presently considered to be the preferred embodiments of the present invention, it will be understood by those skilled in the art that various other modifications maybe made, and equivalents maybe substituted, without departing from the true scope of the present invention. Additionally, many modifications maybe made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for responding to a resource request made by a requesting user node in a network of user nodes, said method comprising the steps of:
   receiving, via publication from a publish-subscribe server node, the resource request at a first user node of the network;
   receiving, at the first user node from one of the user nodes through a direct connection, a response to the resource request;
   determining at the first user node whether to send the received response from the first user node to the requesting user node, or to send the received response from the first user node to another of the user nodes;
   forwarding the received response from the first user node to a second user node of the network, when it is determined to send the received response from the first user node to another of the user nodes; and
   sending the received response from the first user node to the requesting user node, when it is determined to send the received response from the first user node to the requesting user node.

2. The method as defined in claim 1, wherein in the determining step, the determination of whether to send the response to the requesting user node or to send the response to another of the user nodes is a random decision made by the first user node.

3. The method as defined in claim 2, wherein in the determining step, the random decision is made based on a weighting factor corresponding to the probability that the first user node will decide to send the response to the requesting user node.

4. The method as defined in claim 1, wherein the forwarding step includes the sub-steps of:
   randomly selecting one of the user nodes to which the first user node is connected to be the second user node; and
   forwarding the response from the first user node to the second user node through a direct connection.

5. The method as defined in claim 1, further comprising the step of repeating the steps of determining and forwarding until in the determining step a user node that received the response decides to send the response to the requesting user node.

6. The method as defined in claim 1, wherein the step of sending the response to the requesting user node includes the sub-steps of:
   directly sending the response to a third user node of the network through a direct connection, the third user node having previously sent the resource request to the publish-subscribe server node for publication; and
   propagating the response from the third user node to the requesting user node.

7. The method as defined in claim 1, wherein the step of sending the response to the requesting user node includes the sub-steps of:
   sending the response to a third user node of the network via the publish-subscribe server node, the third user node having previously sent the resource request to the publish-subscribe server node for publication; and
   propagating the response from the third user node to the requesting user node.

8. The method as defined in claim 1, wherein the response includes the resource that was requested.

9. The method as defined in claim 1, further comprising the steps of:

receiving the resource request at a third user node of the network;

determining whether to send the resource request to the publish-subscribe server node or to send the resource request to another of the user nodes;

forwarding the resource request to a fourth user node of the network through a direct connection, when it is determined to send the resource request to another of the user nodes; and sending the resource request to the publish-subscribe server node for publication, when it is determined to send the resource request to the publish-subscribe server node.

10. The method as defined in claim 9, wherein in each determining step, the determination is a random decision.

11. The method as defined in claim 9, wherein the step of forwarding the resource request includes the sub-steps of:

randomly selecting one of the user nodes to which the third user node is connected to be the fourth user node; and forwarding the resource request from the third user node to the fourth user node through a direct connection, and the step of forwarding the response includes the sub-steps of:

randomly selecting one of the user nodes to which the first user node is connected to be the second user node; and forwarding the response from the first user node to the second user node through a direct connection.

12. The method as defined in claim 9, further comprising the step of publishing the resource request to at least some of the user nodes of the network via the publish-subscribe server node.

13. A non-transitory computer-readable medium encoded with a program for responding to a resource request made by a requesting user node in a network of user nodes, said program containing instructions for performing the steps of:

receiving, via publication from a publish-subscribe server node, the resource request at a first user node of the network;

receiving, at the first user node from one of the user nodes through a direct connection, a response to the resource request;

determining at the first user node whether to send the received response from the first user node to the requesting user node, or to send the received response from the first user node to another of the user nodes;

forwarding the received response from the first user node to a second user node of the network, when it is determined to send the received response from the first user node to another of the user nodes; and sending the received response from the first user node to the requesting user node, when it is determined to send the received response from the first user node to the requesting user node.

14. The non-transitory computer-readable medium as defined in claim 13, wherein in the determining step, the determination of whether to send the response to the requesting user node or to send the response to another of the user nodes is a random decision made by the first user node.

15. The non-transitory computer-readable medium as defined in claim 14, wherein in the determining step, the random decision is made based on a weighting factor corresponding to the probability that the first user node will decide to send the response to the requesting user node.

16. The non-transitory computer-readable medium as defined in claim 13, wherein the forwarding step includes the sub-steps of:

randomly selecting one of the user nodes to which the first user node is connected to be the second user node; and forwarding the response from the first user node to the second user node through a direct connection.

17. The non-transitory computer-readable medium as defined in claim 13, wherein said program further contains instructions for performing the step of repeating the steps of:

determining and forwarding until in the determining step a user node that received the response decides to send the response to the requesting user node.

18. The non-transitory computer-readable medium as defined in claim 13, wherein the step of sending the response to the requesting user node includes the sub-steps of:

directly sending the response to a third user node of the network through a direct connection, the third user node having previously sent the resource request to the publish-subscribe server node for publication; and propagating the response from the third user node to the requesting user node.

19. The non-transitory computer-readable medium as defined in claim 13, wherein the step of sending the response to the requesting user node includes the sub-steps of:

sending the response to a third user node of the network via the publish-subscribe server node, the third user node having previously sent the resource request to the publish-subscribe server node for publication; and propagating the response from the third user node to the requesting user node.

20. The non-transitory computer-readable medium as defined in claim 13, wherein the response includes the resource that was requested.

21. A user node for use in a computer network that includes a plurality of user nodes, with each of the user nodes being connected to at least one other user node through a direct connection, said user node comprising:

a first receiving interface for receiving, via publication from a publish-subscribe server node, a resource request made by a requesting user node;

a second receiving interface for receiving, from one of the user nodes through a direct connection, a response to the resource request;

control means for deciding whether to send the received response from the user node to the requesting user node, or to send the received response from the user node to another of the user nodes; and at least one transmitting interface for selectively forwarding the received response from the user node to a second user node of the network or sending the received response from the user node to the requesting user node, wherein the transmitting interface forwards the received response from the user node to the second user node when the control means decides to send the received response from the user node to another of the user nodes, and sends the received response from the user node to the requesting user node when the control means decides to send the received response from the user node to the requesting user node.

22. The user node as defined in claim 21, wherein the control means randomly decides whether to send the response to the requesting user node or to send the response to another of the user nodes.

23. The user node as defined in claim 22, wherein the control means randomly decides based on a weighting factor.

24. The user node as defined in claim 21, wherein the control means randomly selects one of the other user nodes of the network to be the second user node to which the response is forwarded.

25. The user node as defined in claim 21, wherein the transmitting interface sends the response to the requesting user node by directly sending the response to a third user node of the network through a direct connection so that the response can then propagate from the third user node to the requesting user node, the third user node having previously sent the resource request to the publish-subscribe server node for publication.

26. The user node as defined in claim 21, wherein the transmitting interface sends the response to the requesting user node by sending the response to a third user node of the network via the publish-subscribe server node so that the response can then propagate from the third user node to the requesting user node, the third user node having previously sent the resource request to the publish-subscribe server node for publication.

27. The method as defined in claim 1, wherein the resource request comprises a message that includes a query.

28. The method as defined in claim 1,
wherein in the step of receiving the resource request, the resource request is also received, via publication from the publish-subscribe server node, at a third user node of the network, and
in the step of receiving the response to the resource request, the response to the resource request is received from the third user node through a direct connection.

29. The method as defined in claim 1, wherein in the step of receiving the resource request, the resource request is also received, via publication from the publish-subscribe server node, at the second user node of the network.

30. The method as defined in claim 1, wherein in the step of receiving the resource request, the resource request is received, via publication from the publish-subscribe server node, by a subset of the user nodes of the network, the subset consisting of all of the user nodes that are subscribed to one or more resource channels.

31. The method as defined in claim 30, further comprising the step of contacting the publish-subscribe server node to subscribe the first user node to at least one of the resource channels.

* * * * *